(12) United States Patent
Scott

(10) Patent No.: US 12,295,511 B2
(45) Date of Patent: May 13, 2025

(54) CARPET SEAMING IRON

(71) Applicants: Cordless Carpet Tools Pty Ltd, Maroubra NSW (AU); Michael Adam Fletcher, Cronulla (AU)

(72) Inventor: Kane Archie Scott, Maroubra (AU)

(73) Assignees: Cordless Carpet Tools Pty Ltd, Maroubra (AU); Michael Adam Fletcher, Cronulla (AU)

( * ) Notice: Subject to any disclaimer, the term of this patent is extended or adjusted under 35 U.S.C. 154(b) by 189 days.

(21) Appl. No.: 17/786,901

(22) PCT Filed: Dec. 18, 2020

(86) PCT No.: PCT/AU2020/051388
§ 371 (c)(1),
(2) Date: Jun. 17, 2022

(87) PCT Pub. No.: WO2021/119748
PCT Pub. Date: Jun. 24, 2021

(65) Prior Publication Data
US 2023/0031166 A1  Feb. 2, 2023

(30) Foreign Application Priority Data
Dec. 18, 2019 (AU) .................. 2019904784

(51) Int. Cl.
*B29C 65/00* (2006.01)
*A47G 27/04* (2006.01)
*B29C 65/02* (2006.01)
*B29C 65/24* (2006.01)

(52) U.S. Cl.
CPC .......... *A47G 27/0443* (2013.01); *B29C 65/02* (2013.01); *B29C 65/242* (2013.01)

(58) Field of Classification Search
CPC .............................. B29C 65/02; B29C 65/242
See application file for complete search history.

(56) References Cited

U.S. PATENT DOCUMENTS

| | | |
|---|---|---|
| 5,294,284 A | 3/1994 | Papulski |
| 5,944,943 A | 8/1999 | Kwok et al. |
| 6,172,335 B1 | 1/2001 | Goodrich |
| 2009/0277589 A1 | 11/2009 | Simpson |
| 2019/0111634 A1 | 4/2019 | Izard et al. |
| 2019/0115775 A1 | 4/2019 | Izard et al. |

FOREIGN PATENT DOCUMENTS

AU 2018101025 A4 8/2018

*Primary Examiner* — Philip C Tucker
*Assistant Examiner* — Nickolas R Harm
(74) *Attorney, Agent, or Firm* — Christensen, Fonder, Dardi & Herbert PLLC; John P. Fonder

(57) ABSTRACT

A carpet seaming iron comprising a heater plate arranged for contact with at least one of carpet seaming tape and carpet, and at least one electrical heating element in thermal communication with a heater plate. The carpet seaming iron may be cordless and comprise a battery in the form of a rechargeable battery.

13 Claims, 11 Drawing Sheets

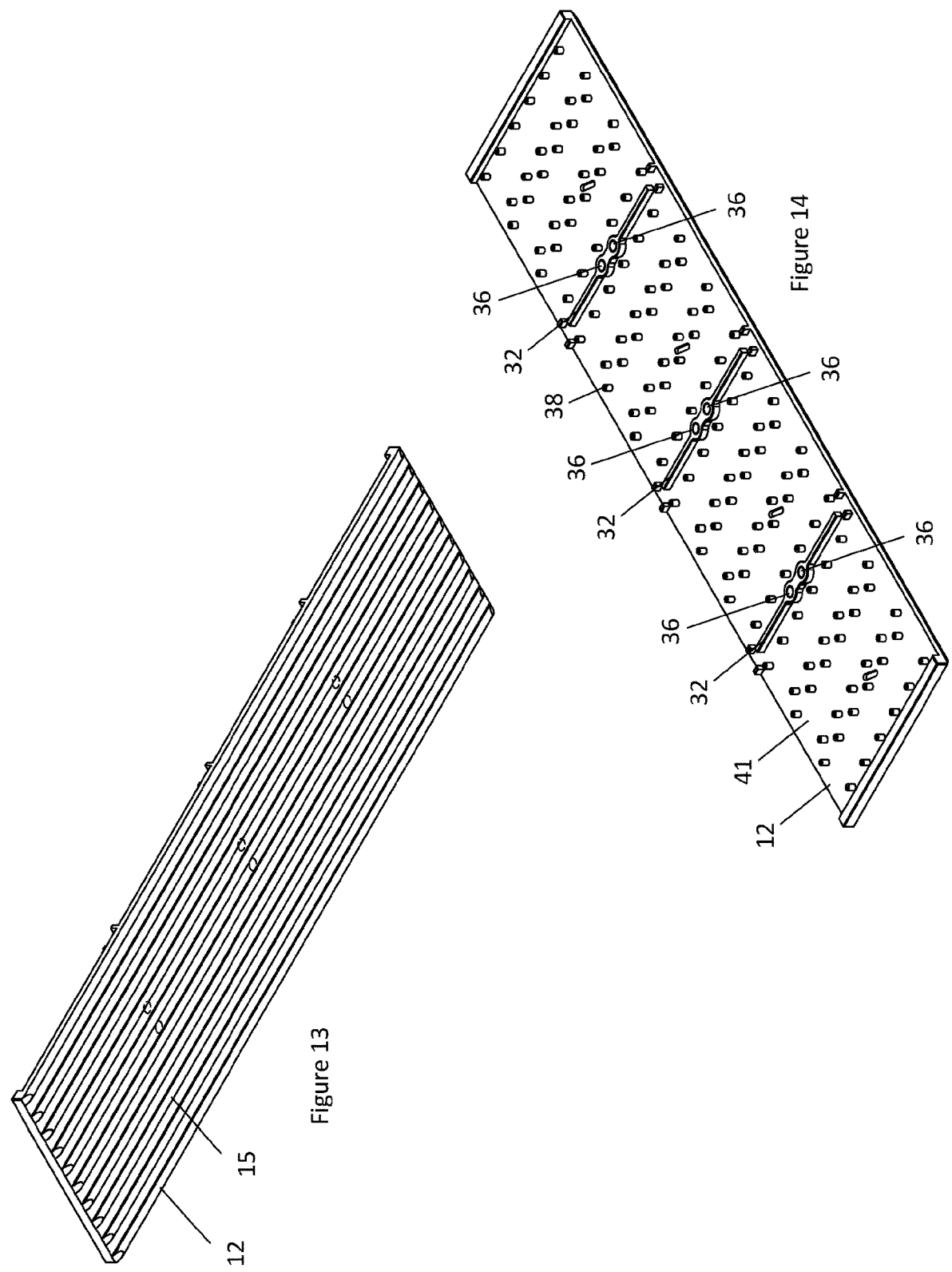

CARPET SEAMING IRON

PRIORITY CLAIM

The present application is a National Phase entry of PCT Application No. PCT/AU2020/051388, filed Dec. 18, 2020, which claims the benefit of Australian Patent Application No. 2019904784, filed Dec. 18, 2019, which are incorporated herein by reference in their entirety.

TECHNICAL FIELD

The disclosure herein generally relates to a carpet seaming iron, and specifically but not exclusively to a carpet seaming iron with improved thermal characteristics.

BACKGROUND

More than one carpet piece may be laid on a floor, for example when a single carpet piece is not wide enough to extend across the entire width of the floor when wall-to-wall carpet is laid, or it is desired to have dissimilar carpet pieces laid on the floor. Two carpets pieces may be contiguous, that is share a common boundary. Generally, the two contiguous carpet pieces are joined at the common boundary for practical, safety and aesthetic reasons.

Carpets can be joined using carpet seam tape. Carpet seam tape generally comprises a ribbon with a hot melt adhesive applied to each side, the hot melt adhesive being activatable by use of a carpet seaming iron ("carpet iron"), a prior art example of which is shown in FIG. 1 and generally indicated by the numeral 1. The prior art carpet iron 1 includes a support structure having a housing 2 and two elongate handles 3 mounted to a central portion 4. Underneath the elongate handles 3 are power switches 5. A heating plate 6 having a substantially rectangular configurating is mounted to the housing 2 and has opposite ends 7 and opposite sides 8. In use, the prior art carpet iron 1 is moved back and forth along a line extending between the ends 7. The heating plate 6 comprises cast iron that can be heated electrically.

One of many possible methods of using carpet seam tape and a carpet iron to join two carpet pieces may comprise at least some of the following steps:

The two carpet pieces are adjacently placed to define a common boundary.

A bead of seam sealer is applied to an edge of one of the two carpet piece at the common boundary.

A length of carpet seaming tape is placed on the floor beneath the two carpet pieces and along the common boundary ("the seam").

The heating plate 102 of the carpet iron 1 is placed on the length of carpet seaming tape with a margin of each of the two carpet pieces resting on the top surface 20 of the housing 12, and the carpet iron 1 moved along the carpet seam tape to soften the hot melt adhesive.

The carpet iron 1 is placed on top of the two carpet pieces and moved along the carpet seam, causing the softened adhesive to enter the underside of each of the two carpet pieces.

Optionally, a seam roller may be run along the seam to press each of the two carpet pieces into the adhesive.

Prior art carpet seam irons may have some of the following disadvantages:

The carpet iron 1 can take longer to reach an operational temperature than desired.

The top surface 20 of the carpet iron 1 can be very hot. Contact between the underside of the two carpet pieces and the top surface 20 of the housing 12 can thermally damage the two carpet pieces.

SUMMARY

Disclosed herein is a carpet seaming iron. The carpet seaming iron comprises a heater plate arranged for contact with at least one of carpet seaming tape and carpet, and at least one electrical heating element in thermal communication with a heater plate.

In an embodiment, the heater plate has a thermal mass of less than one of 250 J/K, 300 J/K, 350 J/K and 500 J/K. The heater plate may have a thermal mass of greater than at least one of 150 J/K, 200 J/K, 250 J/K and 300 J/K. The heater plate may have a thermal mass of substantially 400 J/K.

In an embodiment, the heater plate comprises a metal comprising at least one of aluminium, magnesium, aluminium alloy and magnesium alloy.

In an embodiment, the at least one electrical heating element is intermediate a heat shielding system and the heater plate. The heat shielding system may comprise at least one thermally insulating component.

An embodiment comprises a electrical heating element housing comprising the heater plate and a heater shroud, wherein the heat shielding system and the at least one electrical heating element are disposed within the electrical heating element housing.

In an embodiment, the heat shielding system comprises at least one heat shield membrane. The at least one heat shield membrane may have a thickness of less than 2 mm. The at least one heat shield membrane may have a thickness of greater than 0.5 mm.

In an embodiment, the at least one heat shield membrane comprises polytetrafluoroethylene.

In an embodiment, the heat shielding system comprises at least one heat shield slab. The at least one heat shield stab may have a thickness substantially greater than the at least one heat shield membrane.

In an embodiment, the heat shield slab comprises phenol formaldehyde resin.

In an embodiment, the at least one electrical heating element comprises a plurality of resistors.

An embodiment comprises a battery, a temperature sensor in thermal communication with the base plate configured to generate a temperature signal indicative of the temperature of the base plate, and a power controller in temperature signal communication with the temperature sensor, the power controller being configured to control power flow from the battery to the at least one electrical heating element using the temperature signal.

In an embodiment, the power controller is an analogue proportional-integral-derivative controller.

In an embodiment, the battery comprises a lithium ion polymer battery.

Disclosed herein is a carpet seaming iron. The carpet seaming iron comprises at least one electrical heating element in thermal communication with a heater plate arranged for contact with carpet. The carpet seaming iron comprises a electrical heating element housing comprising the heater plate and a heater shroud, wherein the at least one electrical heating element is disposed within the electrical heating element housing.

In an embodiment, the at least one electrical heating element is intermediate a heat shielding system disposed within the electrical heating element housing and the heater plate.

Disclosed herein is a method for joining a first piece of carpet to another piece of carpet. The method comprises arranging at least one of the first piece of carpet and the second piece of carpet such that the first piece of carpet is adjacent the second piece of carpet. The method comprises disposing a length of carpet seaming tape beneath the first piece of carpet and the second piece of carpet and at a boundary common to the first piece of carpet and the second piece of carpet. The method comprises heating the first piece of carpet and the second piece of carpet at their common boundary using the carpet seaming iron defined by any one of the preceding claims.

An embodiment comprises softening the carpet seaming tape with the carpet seaming iron.

Any of the various features of each of the above disclosures, and of the various features of the embodiments described below, can be combined as suitable and desired.

BRIEF DESCRIPTION OF THE FIGURES

Embodiments of a carpet seaming iron will now be described by way of example only with reference to the accompanying figures in which:

FIG. 13 shows a bottom perspective view of the heater plate of the carpet seaming iron of FIG. 2.

FIG. 14 shows a top perspective view of the heater plate of the carpet seaming iron of FIG. 2.

DESCRIPTION OF EMBODIMENTS

Figure 1:
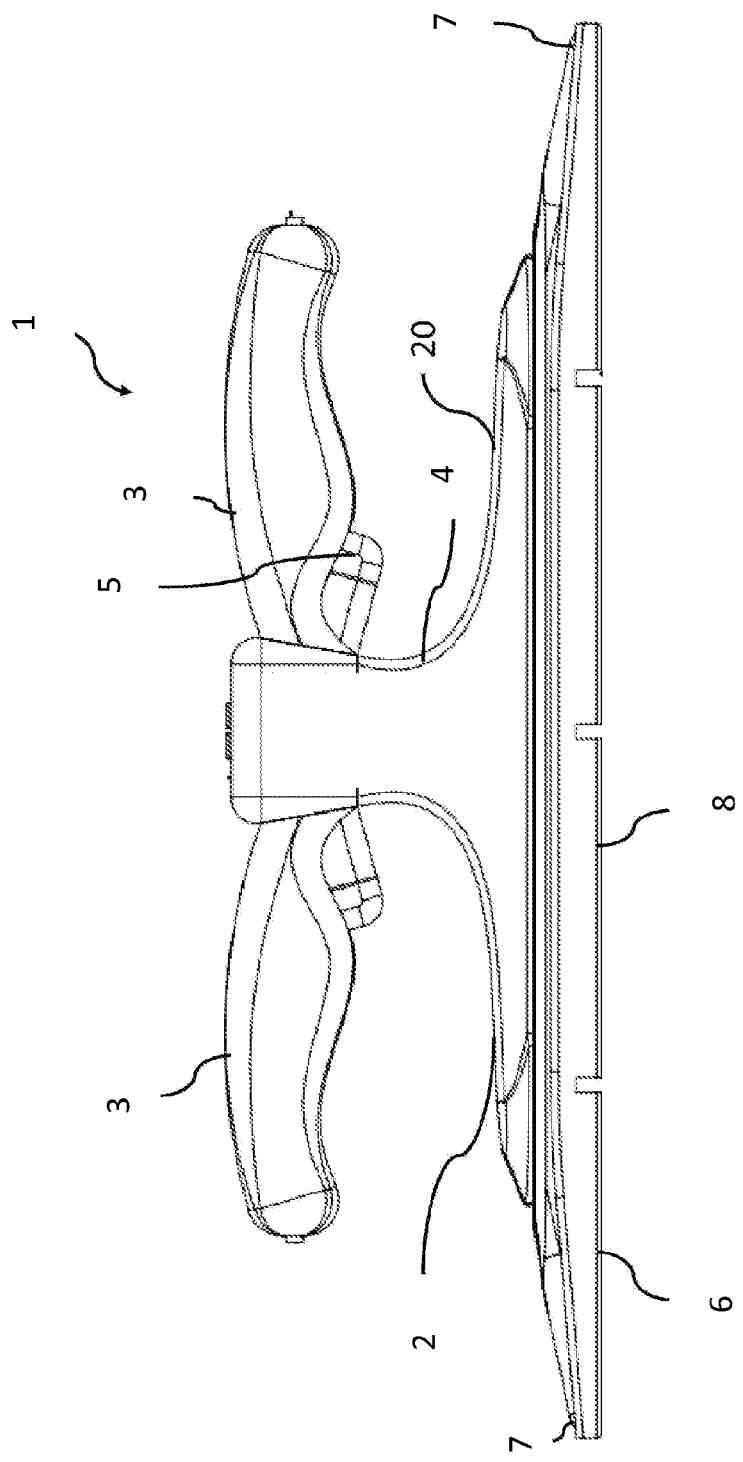
FIG. 1 shows a side elevational view of a prior art carpet seaming iron.
Figure 2:
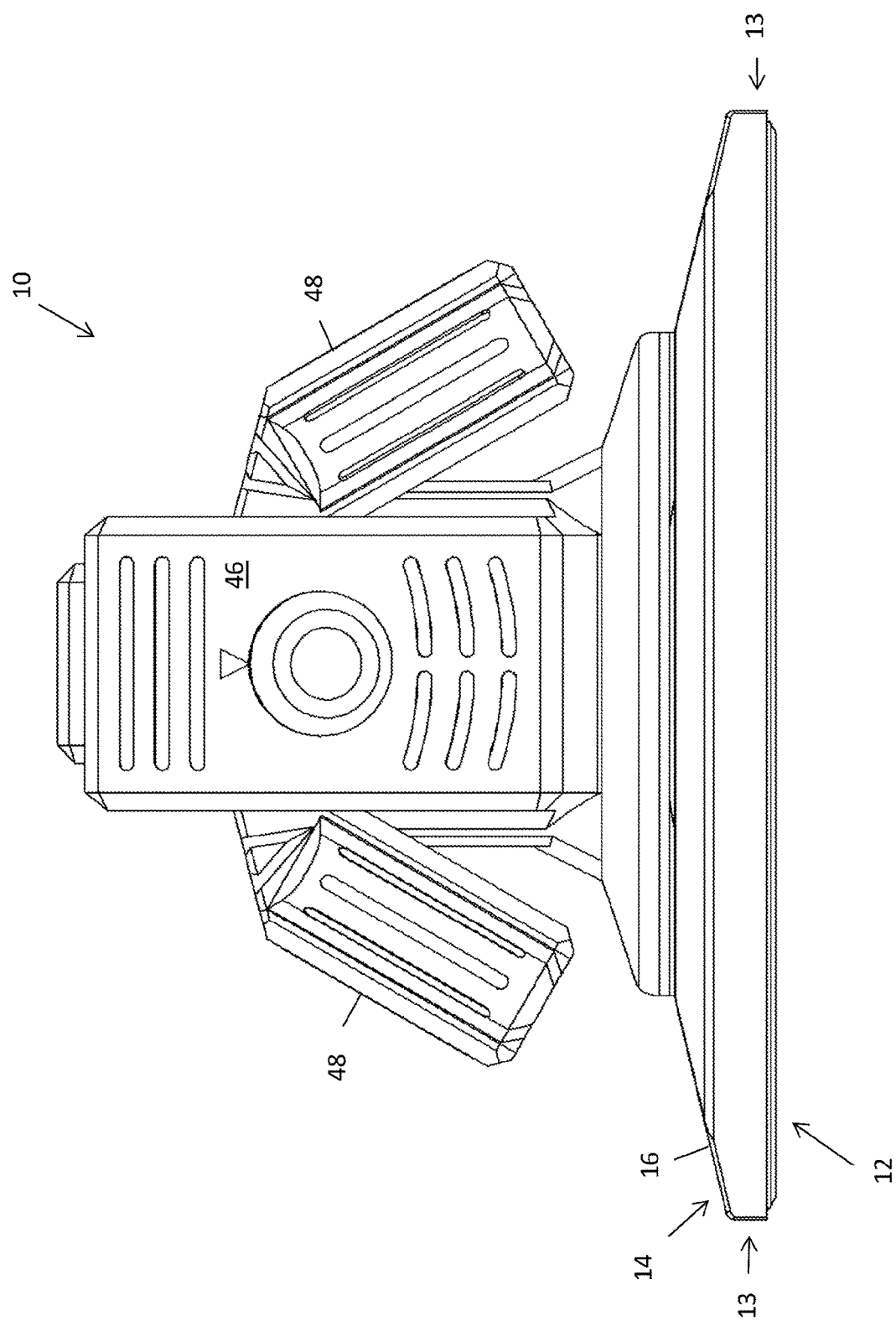
FIG. 2 shows a front elevation view of an embodiment of a carpet seaming iron.
Figure 4:
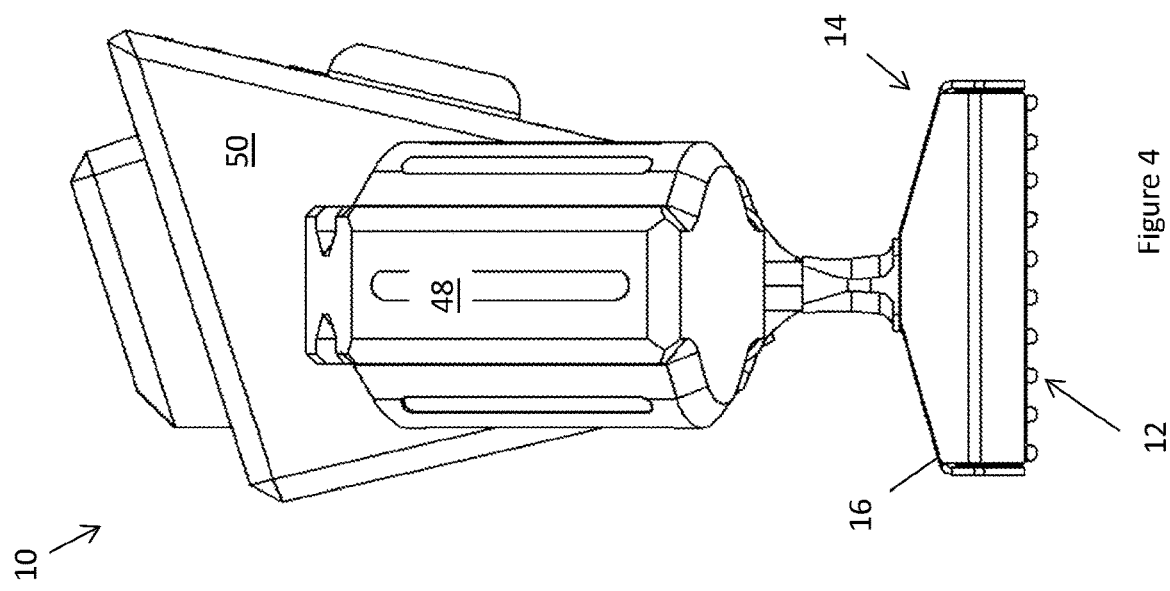
FIGS. 3 and 4 respectively show front isometric and side elevational views of the carpet iron of FIG. 2.
Figure 3:
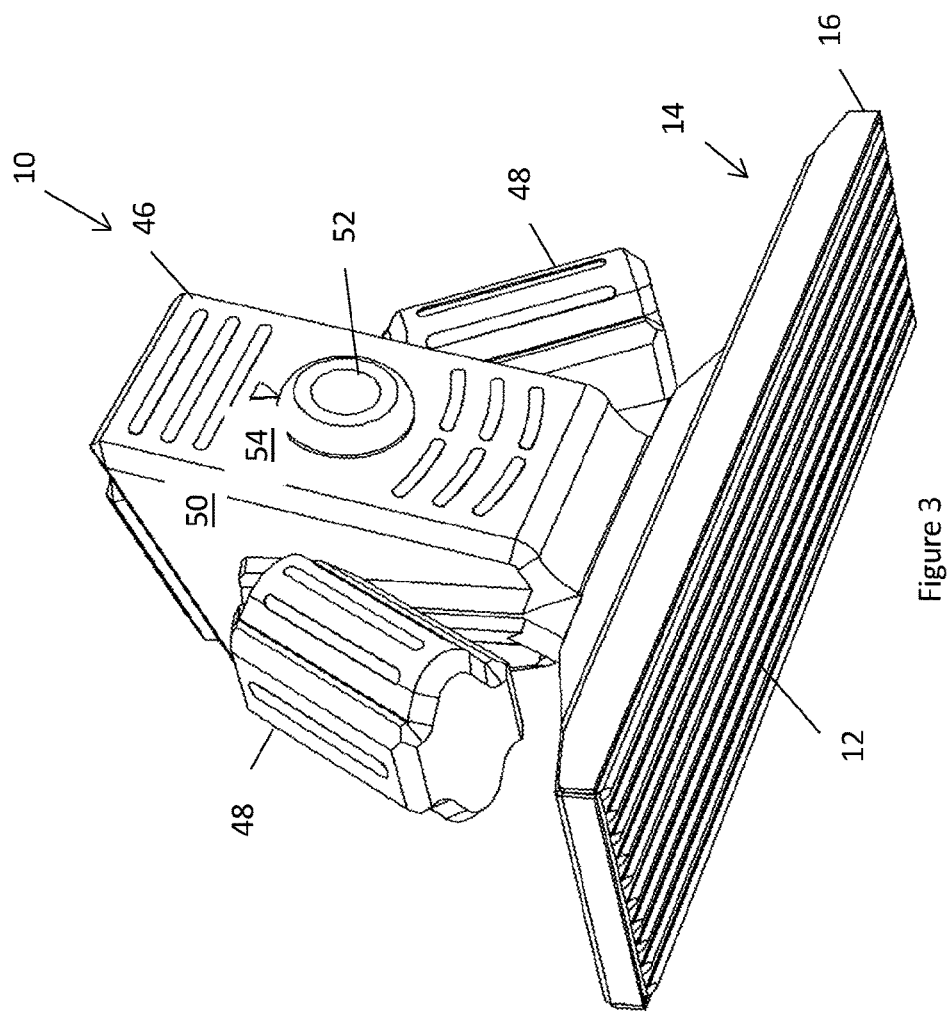

FIG. 2 shows a front elevation view of an embodiment of a carpet seaming iron ("carpet iron"), the carpet iron being generally indicated by the numeral 10. FIGS. 3 and 4 respectively show isometric and side elevational views of the carpet iron 10. The carpet iron comprises a heater plate 12 in the form of a solid heater plate 12 having a thickness of approximately 4 mm and arranged for contact with carpet and carpet seaming tape, being at the bottom of the carpet iron 10. The major exterior surface 15 of the heater plate has dimensions of approximately 300 mm×75 mm and is ribbed, comprising a plurality of longitudinally arranged ribs, to mate with adhesive lines on an example of seaming tape, however the exterior surface may be flat or have generally any suitable configuration. The heater plate 12 is heated during operation to a temperature that can activate the adhesive properties of a carpet seam tape, which is generally in the range of 100 degrees centigrade to 200 degrees centigrade, however the temperature may be outside of this range depending on the thermal properties of the selected carpet seaming tape and carpet. In use, carpet iron 10 is moved back and forth along a line extending between the ends 13 while heater plate 12 is in contact with carpet or carpet seaming tape. Specifications for heater plate 12 are tabulated in Table 1.

TABLE 1

Heater plate specifications.

| | |
|---|---|
| Material | Aluminium alloy |
| Mass | ~0.45 kg |
| Specific heat | 900-940 J/C/kg. |
| Thermal mass | 405-423 J/C |
| Thermal conductivity | 140 W/m/C |
| Coating | Optional exterior polytetrafluoroethylene coating |

The heater plate 12 has a thermal mass of substantially 400 J/K, however otherwise identical alternative embodiments may generally have a thermal mass in the range of 300 J/K to 500 J/K. Some suitable aluminium alloys for the heater plate 12 include but are not limited to 3003, 5050, 6061, 7050, 8006. Alternatively, the heater plate 12 may comprise aluminium. Some alternative embodiments of a carpet iron 10 comprise a heater plate 12 comprising magnesium alloy in the form of a magnesium-aluminium-zinc alloy or other suitable alloy, and can have a thermal mass of substantially 300 J/K (generally 250 J/K to 350 J/K). In some embodiments with an aluminium alloy, magnesium alloy or other suitable metal heater plate 12, the quantity of material in the heater plate 12 is reduced by one third or more, with a corresponding reducing of thermal mass by one third or more to, for example, 200 J/K. The reduction in strength and robustness resulting from the reduction in the quantity of material may be acceptable for some applications, for example light duty applications. Structural stiffening may be used, examples of which include but are not limited to trusses or metal foams.

The thermal mass of the heater plate 12 is significantly less than that of the prior art carpet iron 1, which has a cast iron heater plate of 1.45 kg mass and a thermal mass of 658 J/K. Consequently, the carpet iron 10 may heat up more quickly than prior art carpet iron 1. An optional exterior polytetrafluoroethylene ("Teflon") or other polymer coating may prevent oxidization of an aluminium alloy or magnesium alloy heater plate 12, reduce sliding friction between the heater plate 12 and the carpet, and facilitate cleaning. The heater plate 12 may be a composite, layered material. For example, the heater plate may comprise at least one sheet of a magnesium alloy bonded to at least one sheet of an aluminium alloy.

Figure 5:
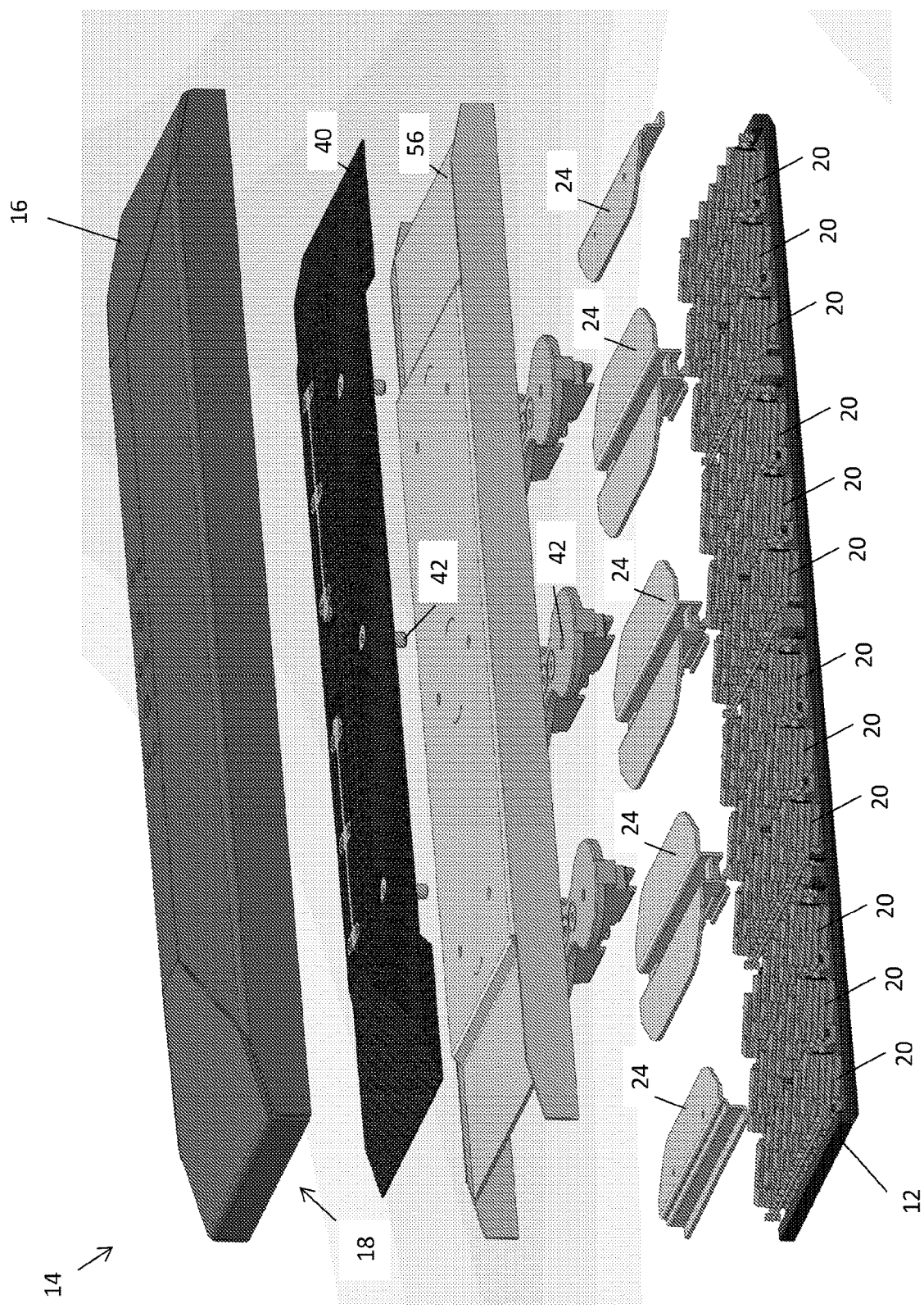
FIGS. 5 and 6 respectively show an exploded isometric view and an exploded side elevational view of a electrical heating element housing of the carpet seaming iron of FIG. 2.
Figure 6:
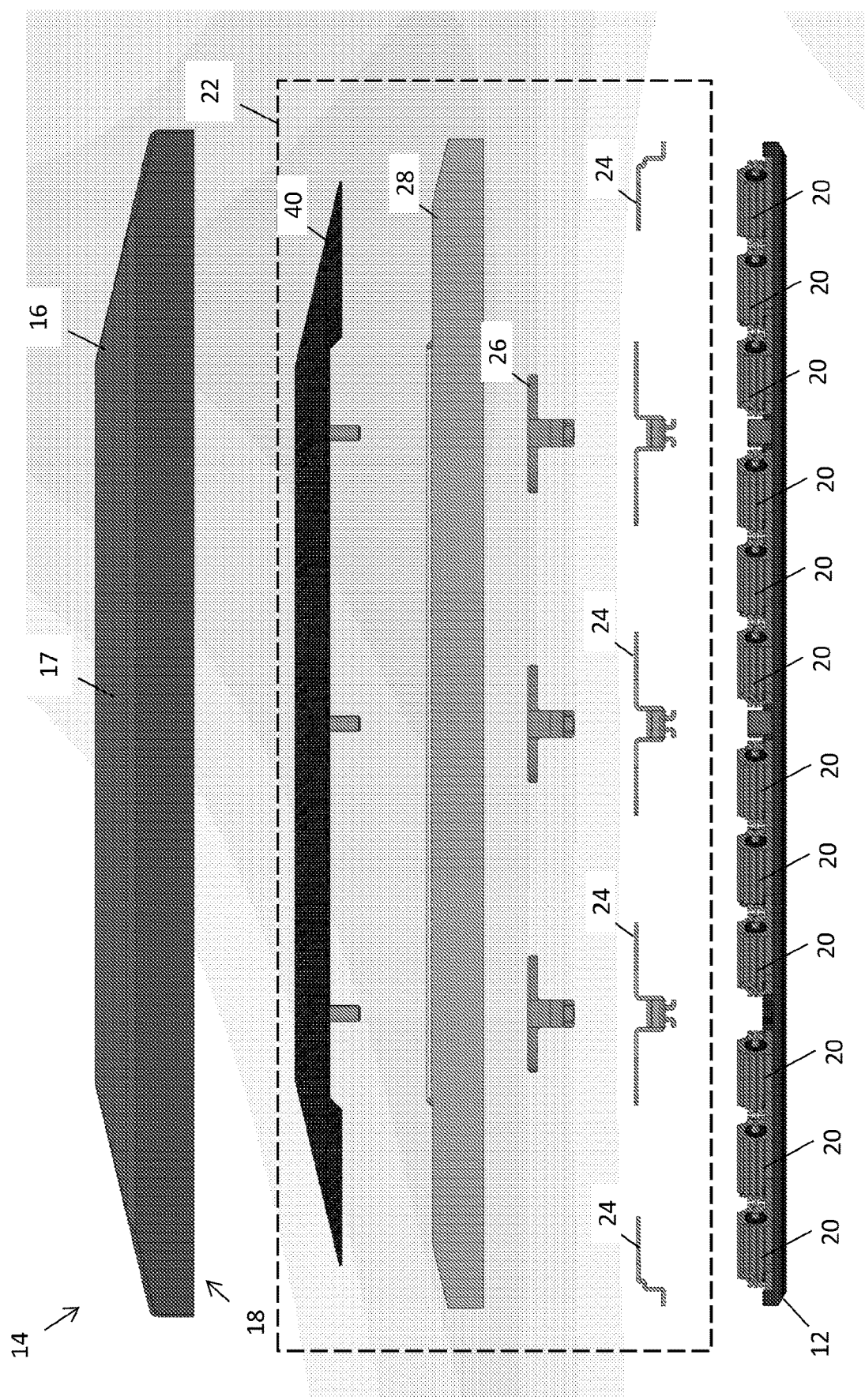
Figure 7:
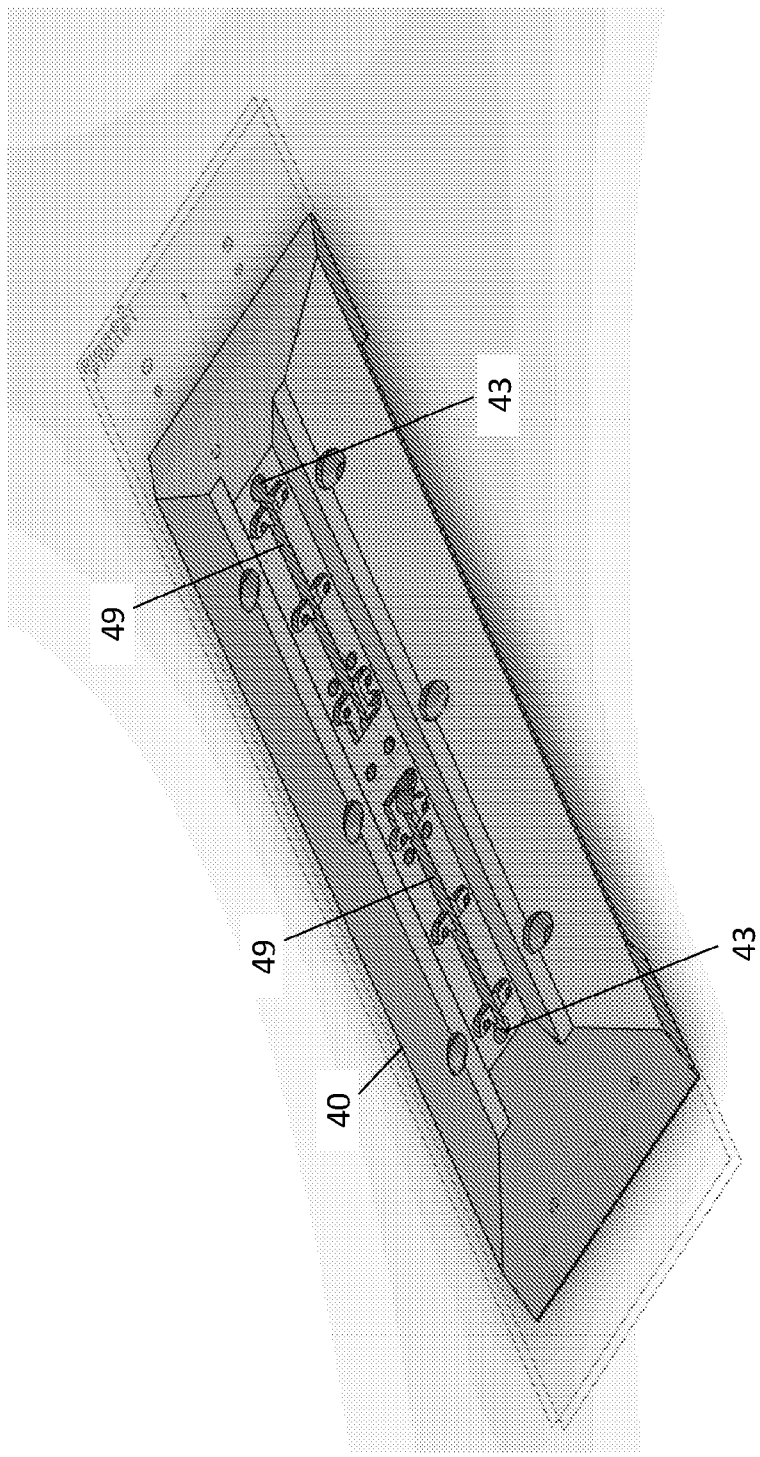
FIG. 7 shows an isometric view of a heat shield slab of the carpet seaming iron of FIG. 2.
Figure 9:
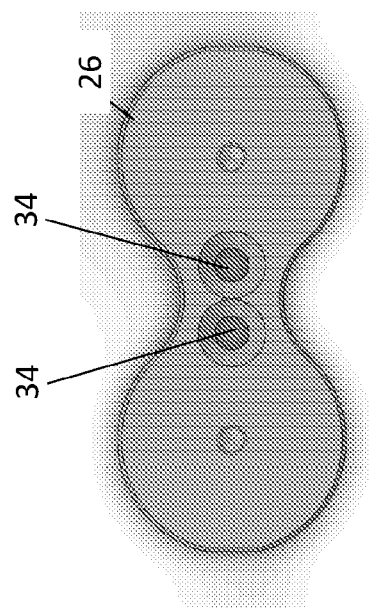
FIGS. 8-10 shows perspective, plan and bottom views of a heat shield membrane clamp of the carpet seaming iron of FIG. 2.
Figure 8:
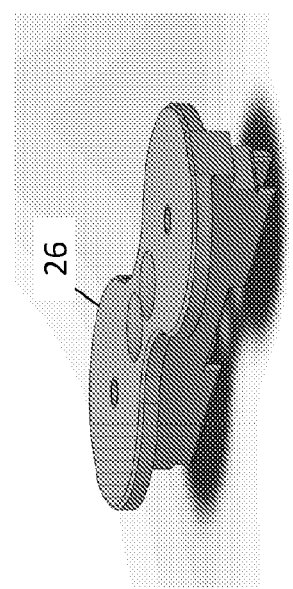
Figure 10:
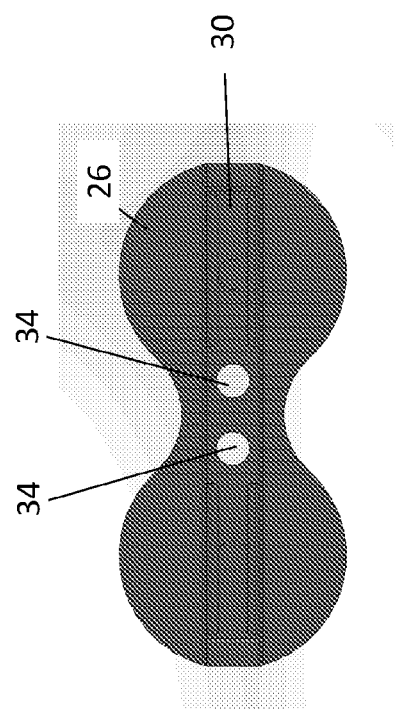
Figure 11:
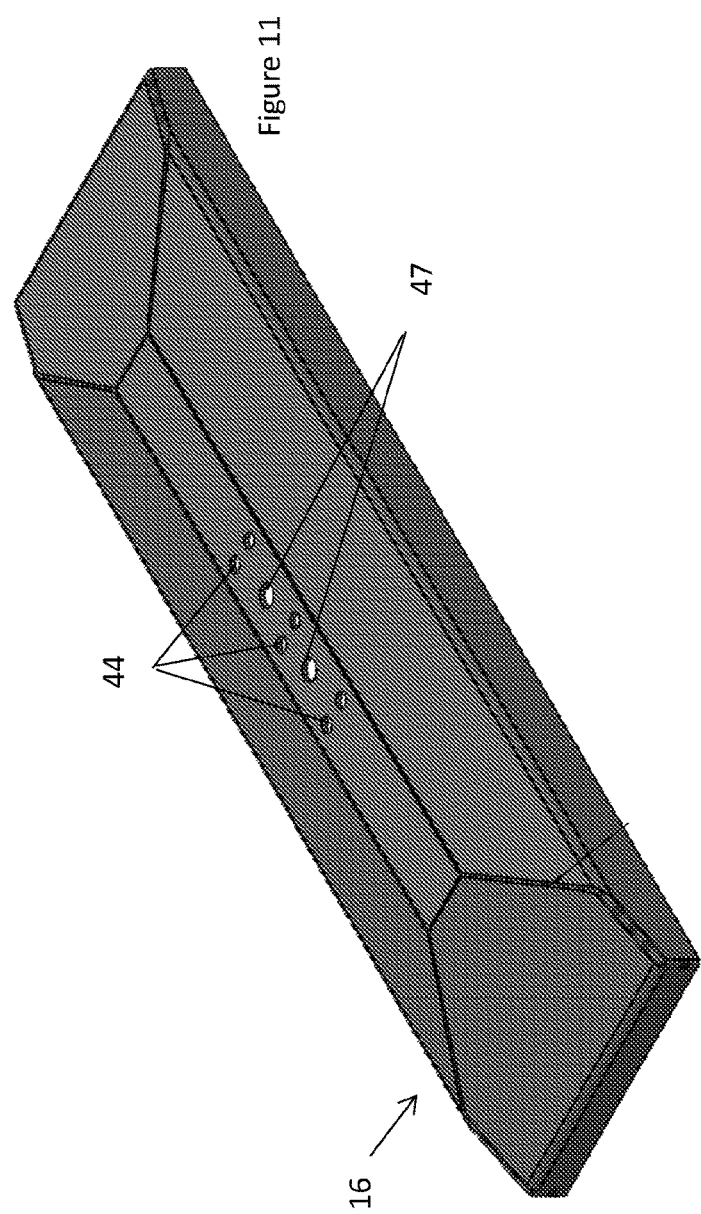
FIG. 11 shows a top perspective view of a heater shroud of the carpet seaming iron of FIG. 2.
Figure 12:
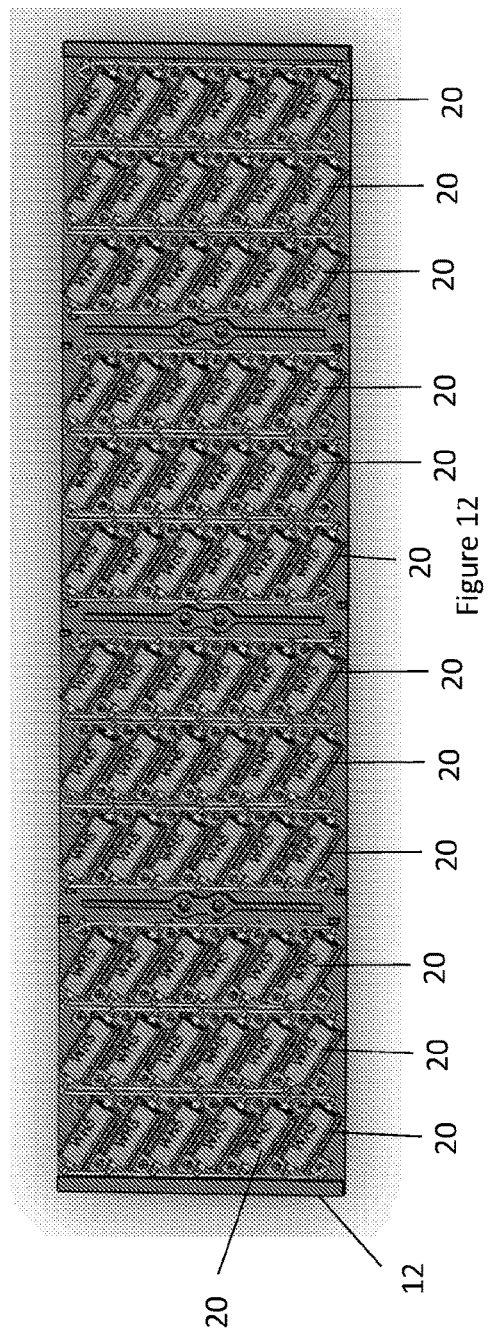
FIG. 12 shows a top view of the heater plate of the carpet seaming iron of FIG. 2 having attached there to a plurality of electrical heating elements.

The carpet iron 10 comprises a electrical heating element housing 14, shown in exploded and side elevational views on FIGS. 5 and 6 together with parts disposed therein, which comprises a heater shroud 16 defining a cavity 18 and the heating plate 12 which closes the shroud 16. The heater shroud 16 comprises a metal in the form of 1.5 mm thick (or otherwise) aluminium or alternatively aluminium alloy, however an otherwise identical alternative embodiments comprises a polymer heater shroud, examples of which include 1-3 mm thick poly(methyl methacrylate), and a glass reinforced polymer, or generally any suitable and desired material including steel or other metal. A plurality of electrical heating elements 20 in the form of a plurality of power resistors 20 are in thermal communication with heater plate 12 and disposed in cavity 18, being fastened with fasteners in the form of screws to the heater plate 12. Thermal paste is disposed between each of the plurality of electrical heating elements 20 and the heater plate 12. The plurality of heating elements are disposed on an inner flat surface of the heater plate 12. A plurality of locating elements 38 in the form of a plurality of bosses protrude from the inside surface 41 of the heating plate 12. The plurality of electrical heating elements 20 receive the plurality of locating elements 38 within apertures defined thereby. The plurality of electrical heating elements are arranged in a plurality of parallel wired electrical heating element sets to form a plurality of heating zones. In the present embodiment, there are four such sets and four corresponding zones, however alternative embodiments may have less than or greater than four sets of parallel wired electrical heating elements and four heating zones. An otherwise identical embodiment has at least one electrical heating element in thermal contact with the heating plate 12. The at least one electrical heating element may comprise, for example, a nichrome foil, a coil of nichrome wire, a thick film heater, or any suitable and desired form of electrical heating element. Another embodiment has a single heating zone.

As best seen in FIG. 6, disposed in the cavity 18 of heater shroud 16 is a heat shielding system 22, which in this but not necessarily in all embodiments comprises thermally insulating material. The at least one electrical heating element 20 is intermediate the heat shielding system 22 and the heating plate 12. The heat shielding system 22 comprises at least one heat shield 24, 28 comprising at least one material (which may be a composite) of lower thermal conductivity than the heating plate 12, for example having a thermal conductivity of less than at least one of ⅒, 1/100 and 1/500 of that of the heating plate 12. Consequently, heat generated by the at least one electrical heating element 20 preferentially flows outwardly through the heater plate 20 rather than inwardly, which may:

reduce the amount of electrical energy required to heat the heating plate 12 to an operational temperature;

reduce the time taken for the heating plate 12 to reach an operational temperature; and reduces the temperature of the heater shroud when the plurality of electrical heating elements 20 are powered.

Reducing the amount of electrical energy required to heat the heating plate 12 to an operational temperature may be beneficial for battery powered embodiments. Reducing the time taken for the heating plate 12 to reach an operational temperature may save time for a carpet installer. Reducing the temperature of the heater shroud 16 reduces the chance of burning the underside of the carpets when the heater plate 12 is placed on a length of carpet seaming tape with a margin of each of two carpet pieces resting on the top surface 70 of the heater shroud 16, to soften the hot melt adhesive.

The heat shielding system 22 comprises at least one heat shield membrane 24, in this embodiment a plurality of heat shield membranes 24 at the plurality of electrical heating elements 20, in the form of a polytetrafluoroethylene membranes having a thickness of substantially 1 mm, however generally any suitable membrane material, an example of which includes but is not limited to biaxially-oriented polyethylene terephthalate, may be used. The membrane 24 may have any suitable thickness, for example in the range of 0.5-2 mm. The at least one heat shield membrane 24 has a lower thermal conductivity than the heating plate 12, having a thermal conductivity of approximately 260 mW/m/C. Most of the thermal shielding may be achieved by the at least one heat shield membrane 24, but not necessarily in all embodiments. A plurality of heat shield membrane clamps 26 comprising 6061 aluminium alloy clamp the plurality of heat shield membranes 26 to the heater plate. Each of the plurality of heat shield membrane clamps 26 define a channel 30 for receiving a heater plate rib 32, and comprise central faster apertures 34 for receiving therein fasteners in the form of screws that screw into threads 36 formed in the heater plate 12. The central location of the fastener apertures 34 allow for thermal expansion of the heat shield membrane clamps 26.

The heat shielding system 22 comprises at least one optional heat shield slab 40 comprising phenol formaldehyde resin, examples of which include but are not limited to TUFNOL, NOVOTEXT, and PAXOLIN. The slab has a depth of approximately 12 mm. The plurality of heat shield membrane clamps 26 engagingly receive heat shield slab fasteners in the form of screws 42 within threads 42 at either end of each of the plurality of heat shield membrane clamps 24. Fasteners are inserted in fastener apertures 44 formed in the heater shroud 16 and are engagingly received by the heat shield slab 40.

The carpet iron 10 comprises a battery in the form of a plurality of power cells for powering the plurality of electrical heating elements 20 and which are internal. That is, the carpet iron is a cordless carpet iron. In an alternative embodiment, the battery may take the form of a removable battery pack. The battery is rechargeable and in the form of at least one lithium ion polymer cells, however lithium sulphur cells, fuel cells, mains power or another power source can be alternatively used. The battery is in electrical power communication with the plurality of electrical heating elements 20.

Carpet iron 10 comprises a body 46, attached to which are handles 48 in the form of arms depending from the sides 50 of body 46, and which are configured to be grasped by the hands of a user. The handles 48 are inclined, however they may alternatively be parallel to the heater plate or have generally any suitable angle. The plurality of power cells are disposed within the handles 48. The carpet iron 10 comprises a temperature sensor comprises at least one thermistor in thermal communication with the base plate 12 configured to generate a temperature signal indicative of the temperature of the base plate 12. The carpet iron 10 comprises a power controller in temperature signal communication with the temperature sensor and disposed in the body 46. The power controller is configured to control power flow from the battery to the at least one electrical heating element 20 using the temperature signal. The power controller comprises a Schmitt trigger comparator (also known as a bang-bang controller). Other types of controllers can be used, for example an analogue proportional-integral-derivative controller comprising a plurality of operational amplifiers, a multivariable controller, a digital controller, or generally any suitable controller. A temperature set interface 52 in the form of a temperature dial is mounted to a front face 54 of the body 46. A user can twist the dial to set the temperature that the power controller heats the heating plate 12 to. The temperature set interface can alternatively comprise buttons or generally any suitable control elements.

Heater shroud 16 defines wire apertures 47 through which polytetrafluoroethylene shrouded power wiring and temperature sensing wiring are threaded, carrying power from the battery to the plurality of electrical heating elements 20 and temperature information from the temperature sensor to the power controller. The wires run along wire conduits 49 in the form of channels defined by the slab 40 and through through-holes 43 to reach either end of the heating plate 12.

Figure 15:
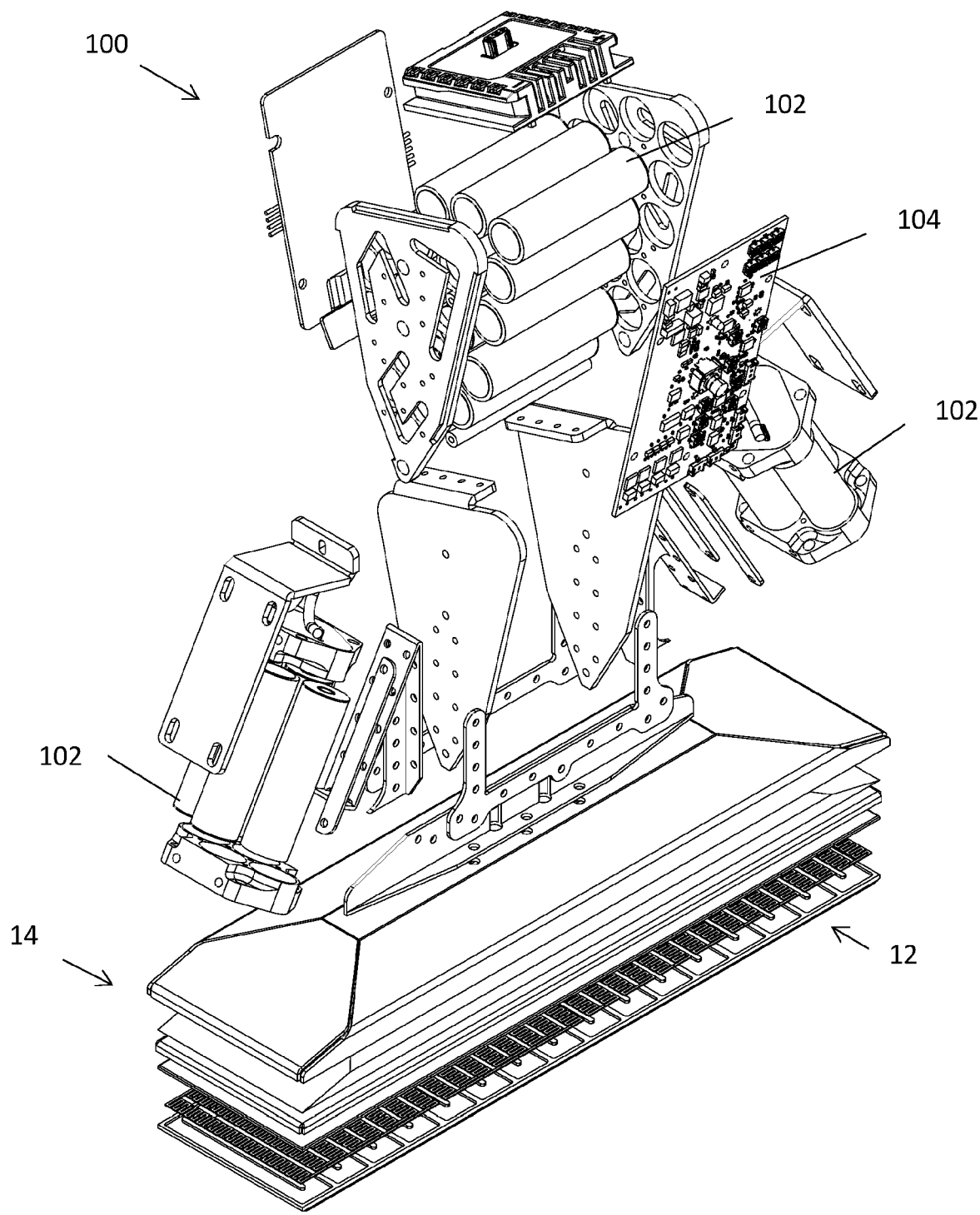
FIG. 15 shows an exploded view of another embodiment of a carpet seaming iron, with a body casing and handle casings removed.

FIG. 15 shows an exploded view of another embodiment of a carpet seaming iron 100, with a body casing and handle casings removed. Parts similar or identical in form and/or function to those in FIGS. 1-14 are similarly numbered. Power cells 102 are disposed in the handles and the body. The carpet seaming iron 100 comprises a circuit board 104.

Figure 17:
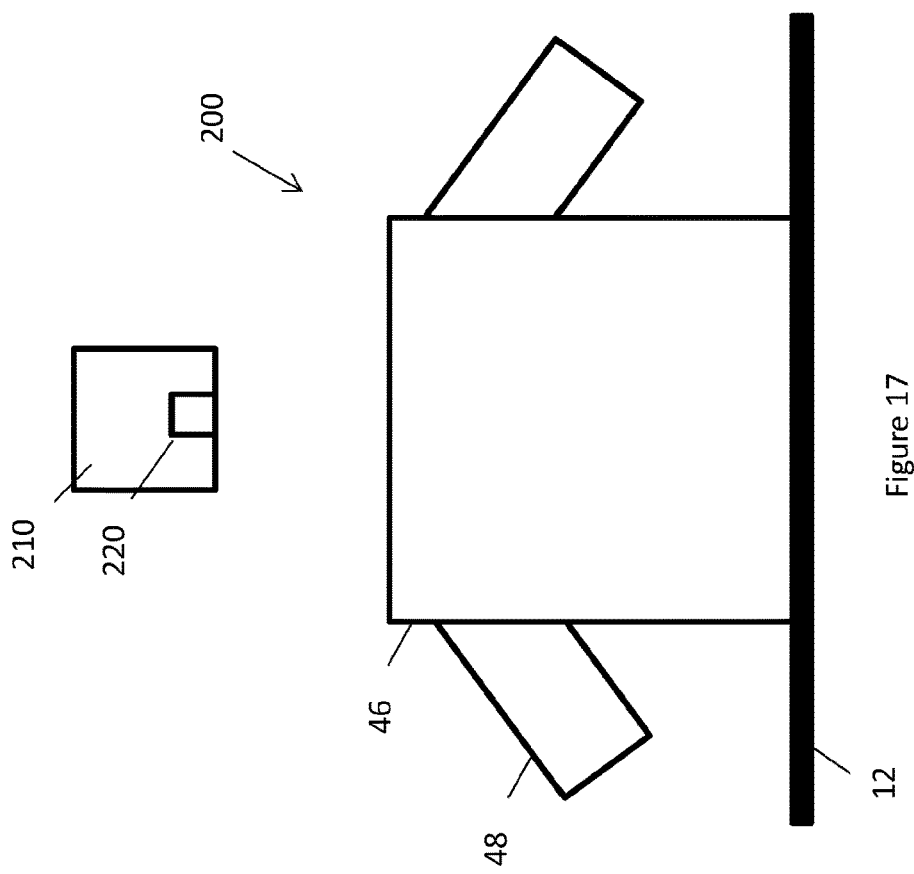
FIGS. 16 and 17 show a schematic diagram of another embodiment of a carpet seaming iron and a removable battery.
Figure 16:
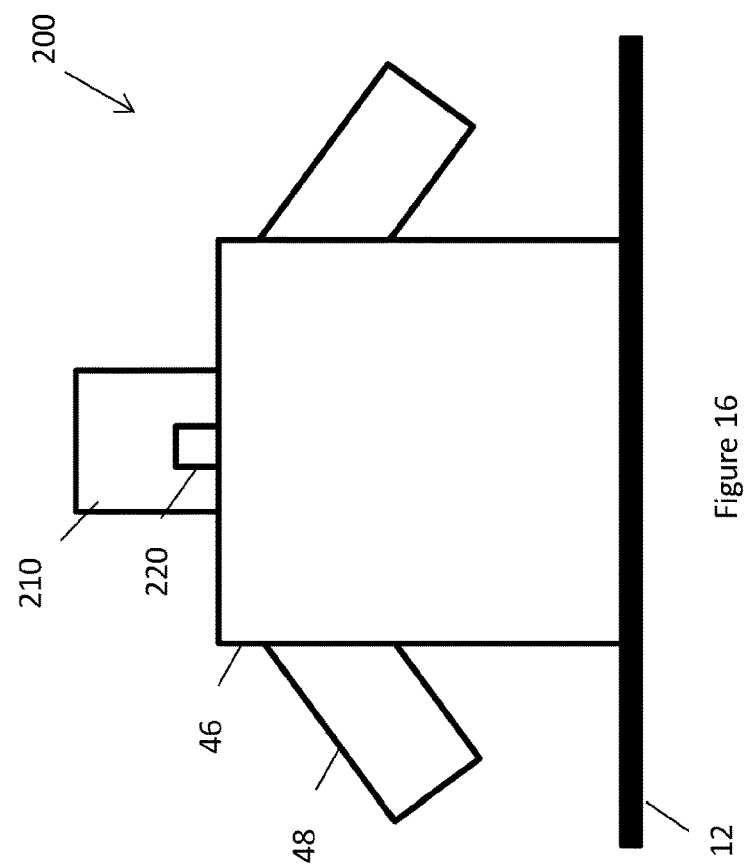

FIGS. 16 and 17 show a schematic diagram of another embodiment of a carpet seaming iron comprising a carpet seaming iron body 46 and a removable battery 210 in the form of a lithium ion battery pack, where parts similar or identical in form and/or function to those in earlier figures similarly numbered. The battery 210 is attached to the body 46 by at least one clip 220 in FIG. 16, and detached from the body 46 in FIG. 17. The body 46 is configured to engagingly receive the clip. The body 46 may alternatively comprise the clip, and the battery 210 configured to engagingly receive the clip. The detached battery 210 can be recharged in a battery charger plugged into mains, for example. Instead of clips, alternative fastening systems can be used, for example screws or bolts. Nickle metal hydride or generally any type of rechargeable battery may be used.

Steps of an embodiment of a method for joining a first piece of carpet to another piece of carpet is now described. Either of the carpet irons 10 and 100 can be used to execute the steps. A step comprises arranging at least one of the first piece of carpet and the second piece of carpet such that the first piece of carpet is adjacent the second piece of carpet. A step comprises disposing a length of carpet seaming tape beneath the first piece of carpet and the second piece of carpet and at a boundary common to the first piece of carpet and the second piece of carpet. A step comprises heating the first piece of carpet and the second piece of carpet at their common boundary using the carpet seaming iron defined by any one of the preceding claims. The hot heater plate 12 can be placed in contact with upward face of the first and second pieces of carpet at the boundary. The carpet seaming tape adheres to the first piece of carpet and the second piece of carpet. An optional step comprises softening the carpet seaming tape with the carpet seaming iron 10. This can comprises placing the hot heater plate 12 on the carpet seaming tape.

Now that embodiments have been described, it will be appreciated that some embodiments may have some of the following advantages:

The time for embodiments to heat up to an operational temperature may be less than prior art carpet seaming irons.

Embodiments may reduce the risk of burning carpet or an operator.

Variations and/or modifications may be made to the embodiments described without departing from the spirit or ambit of the invention. For example, a nichrome sheet sandwiched between ceramic epoxy and in turn aluminium plates, and top capped with a Teflon sheet, may replace the heater assembly. The heat shield membrane may be thinner than 0.5 mm or thicker than 2 mm. Embodiments may not be cordless and may be mains powered. The insulating materials may comprise insulating paper, resins, ceramics, or any suitable material. The heater plate and other components may generally have any suitable dimensions. The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A carpet seaming iron, comprising:
   a heater plate arranged for contact with at least one of carpet seaming tape and carpet; and
   at least one electrical heating element in thermal communication with the heater plate arranged for contact with carpet, wherein the heater plate has a thermal mass of less than 500 J/K:
   a battery;
   a temperature sensor in thermal communication with the heater plate configured to generate a temperature signal indicative of the temperature of the heater plate; and
   a power controller in temperature signal communication with the temperature sensor, the power controller being configured to control power flow from the battery to the at least one electrical heating element using the temperature signal,
   wherein the at least one electrical heating element is intermediate a heat shielding system and the heater plate, and the heat shielding system comprises a phenol formaldehyde resin heat shield slab.

2. The carpet seaming iron of claim 1, wherein the heater plate has a thermal mass of less than at least one of 250 J/K, 300 J/K, 350 J/K.

3. The carpet seaming iron of claim 1, wherein the heater plate has a thermal mass of greater than at least one of 150 J/K, 200 J/K, 250 J/K, 300 J/K.

4. The carpet seaming iron of claim 1, wherein the heater plate has a thermal mass of 400 J/K.

5. The carpet seaming iron of claim 1, wherein the heater plate comprises a metal comprising at least one of aluminium, magnesium, aluminium alloy and magnesium alloy.

6. The carpet seaming iron of claim 1, further comprising an electrical heating element housing comprising the heater plate and a heater shroud, wherein the heat shielding system and the at least one electrical heating element are disposed within the electrical heating element housing.

7. The carpet seaming iron of claim 1, wherein the heat shielding system comprises at least one heat shield membrane.

8. The carpet seaming iron of claim 7, wherein the at least one heat shield membrane comprises polytetrafluoroethylene.

9. The carpet seaming iron of claim 1, wherein the at least one electrical heating element comprises a plurality of resistors.

10. The carpet seaming iron of claim 1, wherein the power controller is an analogue proportional-integral-derivative controller.

11. The carpet seaming iron of claim 10, wherein the battery comprises a lithium ion polymer battery.

12. A method for joining a first piece of carpet to a second piece of carpet, the method comprising:

arranging at least one of the first piece of carpet and the second piece of carpet such that the first piece of carpet is adjacent the second piece of carpet;

disposing a length of carpet seaming tape beneath the first piece of carpet and the second piece of carpet and at a boundary common to the first piece of carpet and the second piece of carpet; and heating the first piece of carpet and the second piece of carpet at their common boundary using the carpet seaming iron defined by claim 1.

13. The method of claim 12, further comprising softening the carpet seaming tape with the carpet seaming iron.

* * * * *